W. DUBILIER.
ELECTRICAL CONDENSER.
APPLICATION FILED AUG. 1, 1918.
1,391,672. Patented Sept. 27, 1921.
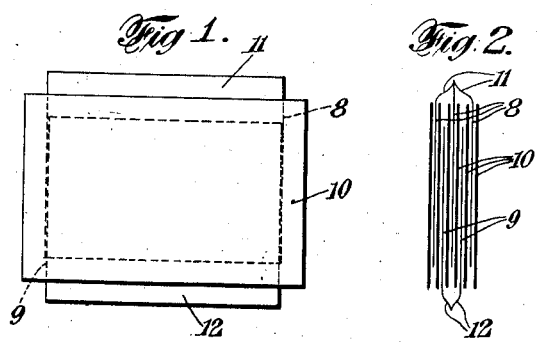

UNITED STATES PATENT OFFICE.

WILLIAM DUBILIER, OF NEW YORK, N. Y.

ELECTRICAL CONDENSER.

1,391,672.　　　　　　Specification of Letters Patent.　　Patented Sept. 27, 1921.

Application filed August 1, 1918. Serial No. 247,740.

*To all whom it may concern:*

Be it known that I, WILLIAM DUBILIER, of New York city, in the county of New York and in the State of New York, have invented a certain new and useful Improvement in Electrical Condensers, and do hereby declare that the following is a full, clear, and exact description thereof.

Prior efforts to improve the efficiency of electrical condensers have been directed mainly toward changes in the dielectric employed with a view to decrease as much as possible the leakage between adjacent plates and other dielectric losses, and little attention has been paid to the character of conducting plates or the manner in which the charging current was led thereto.

This invention has for an object to improve generally the efficiency of condensers where high efficiencies are necessary; especially in regard to the character of conducting plates employed and the disposition of such plates, so as to eliminate to as great an extent as possible, the losses due to resistance of the plates and uneven current distribution, and so as to obtain advantageous conduction and radiation of heat from the interior of the condenser.

Further objects and advantages of the invention will be in part obvious and in part specifically pointed out in the description hereinafter contained, in which I have disclosed one embodiment of my invention; such embodiment however is to be considered merely as illustrative of its principle.

In the drawings:

Figures 1 and 2 are respectively a plan and side view of a condenser made according to my invention.

A condenser extensively used in wireless apparatus consists of a plurality of conducting plates of opposite polarity, and separated by insulating sheets. The condenser is made rectangular, which is the most advantageous shape, the plates being narrower than the insulating sheets so that the side edges of the plates are contained within the outline of such sheets. The end edge portions of the plates of one polarity project beyond one end of the insulating sheets, and the end edge portions of the plates of opposite polarity project beyond the other ends of the insulating sheets, thus providing exposed portions of each of such sets of plates to afford contact surfaces for leading in the charging current. The projecting portions also provide a certain amount of heat radiating surface which aids in preventing an excessive rise in temperature within the condenser. The projecting edge portions of similar plates are usually soldered together to provide good conduction of current to each plate.

Such condensers have always been made with the ends of the conducting sheets exposed, since with this arrangement the conducting sheets may be more easily placed in position and held therein during manufacture.

Condensers of the above type are, however, open to certain objections. In the first place the end edge portions of the conducting plates are relatively remote from the remaining areas of the plates taken as a whole, so that the charging current must travel a relatively great distance in covering the areas of the plates, thus involving a very appreciable resistance loss, in the use of the condenser. Furthermore the charge of each plate is very unevenly distributed over its surface, since the potential will be lowest at the projecting portion of each plate where the charging current is led in, and will increase steadily until it reaches a maximum at the inner end of the plate, where the charging current is zero. In other words the potential difference between the ends of the plates is as great as could be in that shape of condenser. Again, the projecting portions of the conducting plates, being remote from the hottest portions of the condenser, necessitate a relatively long path of travel for the heat to be conducted over, before reaching the edge portions so that it may be radiated therefrom. The terminal strips engage the plates along their shorter sides, so that the contact area through which the charging current must pass, is relatively small, thus bringing about a further increase in resistance losses.

In order to provide a condenser which avoids the above disadvantages I have made use of the principles embodied in the condenser shown in Figs. 1 and 2. As shown therein, conducting plates 8 and 9 are employed in connection with the insulating sheets 10 forming a condenser of dimensions similar to those of the type previously described. In this instance, however, the end edges of the plates 8 and 9 are contained within the outlines of the insulating sheets 10, and the side edge portions 11 and 12 project beyond the insulating sheets 10 so as to form exposed portions adapted to provide contact surfaces for leading in the charging current, and heat radiating surfaces to prevent excessive temperature rise within the condenser. The projecting portions 11 and 12 are respectively soldered together, in the form disclosed, in order to provide suitable terminal connection for leading in the charging current.

It will be noted that, in this latter form of condenser, the distance necessary for the charging current to travel in covering the area of the plates in a condenser of given dimensions, is much reduced. For instance, if the length of the insulating sheets is twice their width, the distance necessary to be traveled by the charging current, will be one-half. The length of the projecting edge portions 11 and 12 being twice as great as that of similar portions of previous structures, the cross sectional area through which the charging current passes in traveling from terminal strips over the surfaces of the plates, will be twice as great in the prior art. The ohmic losses will, therefore, be reduced to one-quarter in the example taken, owing to the reduction in path of travel of the charging current and the increase in cross sectional area of the plate in the direction of which it travels. The distribution of charge over the surfaces of plates 11 and 12 will be twice as uniform as in the structure of the prior art, owing to the fact that the charge varies across the width of the plates, instead of along their lengths. The projecting edge portions 11 and 12, being relatively close to the interior of the condenser, do not necessitate as great a distance of travel of the heat in being conducted to such edge portions, and the heat is also more readily radiated from the exposed portions 11 and 12, owing to their greater area. By actual comparative tests of the above two types of condensers it has been established that, over a period of three hours, the temperature rise of a condenser of given dimensions of the old type is about 30°, while in a condenser of similar dimensions of the type shown in Figs. 1 and 2, a temperature rise only of about 5° occurs. Such a reduced rise in temperature is made possible owing both to the smaller ohmic or heat losses within the condenser, and the improved facilities for conducting and radiating away the heat which is developed therein.

It has been found that the above results may be obtained with condensers of widely differing dimensions, the gain in efficiency varying in a general sense, in proportion to the ratio of plate length to plate width. The dimensions of a condenser for any given purpose must be determined by striking a balance between the practical requirements as to the dimensions of the condenser, and the gain in efficiency which may be effected, by the use of the principles above described.

While I have described a specific form of my invention it is obvious that many changes may be made without departing from the principle thereof, as defined in the following claims.

I claim:

1. A high tension stacked condenser comprising a plurality of rectangular flat conducting plates having one dimension of substantially greater length than the other interleaved with larger rectangular insulating sheets, of greater length than width, side edge portions of the longer dimension of such plates projecting alternately beyond the two longer sides of said insulating sheets, and similarly projecting edge portions of such plates being bound together substantially throughout their whole width, to constitute terminals for the condenser.

2. A high tension stacked condenser comprising a plurality of polygonal plates, conducting plates each having an edge portion of substantially greater length than adjacent edge portions and insulating sheets disposed between the same, the edge portions of said plates which are of greatest length projecting laterally beyond said insulating sheets and terminal connections leading through substantially the whole width of said projecting portions.

3. A high tension stacked condenser comprising a plurality of substantially rectangular flat plates each having one side edge of substantially greater length than adjacent side edges and insulating sheets disposed between the same, a side edge of the greater length of each of said plates projecting laterally beyond said insulating sheets and terminal connections leading to substantially the whole width of each of said projecting edges.

4. A high tension stacked condenser comprising a plurality of flat conducting plates, each having an edge portion of substantially greater length than adjacent edge portions, and insulating sheets disposed between the same, the said conducting plates and insulating sheets being so alternately stacked as to project the edge portions of greater length of said plates laterally beyond said insulating sheets whereby exposed terminal portions of said plates are presented providing the shortest mean heat conduction path to the exterior of the condenser.

5. A high tension stacked condenser comprising a plurality of flat conducting plates, each having an edge portion of substantially greater length than adjacent edge portions, and insulating sheets disposed between the same, the said conducting plates and insulating sheets being so alternately stacked as to project the edge portions of greater length of said plates laterally beyond said insulating sheets, and terminal connections leading to substantially the whole width of each of said projecting edge portions, whereby exposed terminal portions of said plates are presented providing the shortest mean heat conducting path to the exterior of the condenser and the path of lowest mean resistance.

In testimony that I claim the foregoing I have hereunto set my hand.

WILLIAM DUBILIER.